US006747119B2

(12) United States Patent
Brack et al.

(10) Patent No.: US 6,747,119 B2
(45) Date of Patent: Jun. 8, 2004

(54) METHOD AND SYSTEM FOR PREPARING A POLYCARBONATE, COPOLYMERIZATION REAGENT AND POLYCARBONATE

(75) Inventors: Hans-Peter Brack, Herrliberg (CH); Dennis Karlik, Bergen op Zoom (NL); Theodorus Lambertus Hoeks, Bergen op Zoom (NL); John Morgan Whitney, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/107,149

(22) Filed: Mar. 28, 2002

(65) Prior Publication Data

US 2003/0208027 A1 Nov. 6, 2003

(51) Int. Cl.$^7$ ............................................... C08G 64/00
(52) U.S. Cl. .................... 528/198; 264/176.1; 264/219; 264/328.1; 264/330; 264/340; 264/331.8; 359/642; 528/196
(58) Field of Search ........................ 359/642; 264/176.1, 264/219, 328.1, 330, 340, 331.18; 528/196, 198

(56) References Cited

U.S. PATENT DOCUMENTS

| | | | |
|---|---|---|---|
| 4,323,668 A | 4/1982 | Brunelle | |
| 5,521,275 A | 5/1996 | McCloskey et al. | |
| 5,597,887 A | 1/1997 | King, Jr. et al. | |
| 5,696,222 A | 12/1997 | Kaneko et al. | |
| 5,886,132 A | 3/1999 | Varadarajan et al. | |
| 6,037,437 A | 3/2000 | Komiya et al. | |
| 6,294,642 B1 | 9/2001 | Shimoda et al. | |
| 6,300,459 B1 | 10/2001 | Kaneko et al. | |
| 6,307,006 B1 | 10/2001 | Konig et al. | |
| 6,500,914 B1 * | 12/2002 | Brack et al. | 528/196 |
| 6,525,163 B1 * | 2/2003 | Brack et al. | 528/196 |

FOREIGN PATENT DOCUMENTS

| | | |
|---|---|---|
| EP | 0595608 | 7/1997 |
| EP | EP-EP 982 340 A1 | 3/1999 |
| EP | 0976772 | 2/2000 |
| EP | 0980861 | 2/2000 |
| EP | EP 0 982 340 A | 3/2000 |
| JP | H6-157739 | 6/1994 |

\* cited by examiner

*Primary Examiner*—Terressa M. Boykin
(74) *Attorney, Agent, or Firm*—Oppedahl & Larson LLP

(57) ABSTRACT

A method for preparing a polycarbonate comprises preparing a free hydroxyl-containing polycarbonate and reacting the hydroxyl-containing polycarbonate with a mixture of (B) a symmetrical optionally activated aromatic carbonic acid diester and (C) an optionally substituted aromatic hihydroxy compound, diol or diacid. A copolymerization reagent comprises a mixture of (B) a symmetrical optionally activated aromatic carbonic acid diester and (C) an optionally substituted aromatic hihydroxy compound, diol or diacid. A copolymer comprises [polycarbonate]$_x$ moieties; (B) [symmetrical optionally activated aromatic carbonic acid diester]$_y$ moieties and (C) [optionally substituted aromatic hihydroxy compound, diol or diacid]$_z$ moieties, wherein x, y and z are mole percents of the copolymer.

112 Claims, 3 Drawing Sheets

US 6,747,119 B2

METHOD AND SYSTEM FOR PREPARING A POLYCARBONATE, COPOLYMERIZATION REAGENT AND POLYCARBONATE

BACKGROUND OF THE INVENTION

The invention relates to polycarbonates. More specifically, it relates to a method and system for preparing a polycarbonate copolymer by addition of a copolymerization reagent to a copolycarbonate. Also, the invention relates to a copolycarbonate produced by the method and system.

Polycarbonate compositions exhibit valuable mechanical properties such as impact resistance, heat resistance and transparency. The compositions are widely used in engineering applications. In certain processes and applications such as optical storage media, it is desirable to use a polycarbonate composition that is transparent and that exhibits low water affinity, good processibility, good heat resistance and low birefringence. Water affinity is particularly undesirable in a composition used as a high density optical data storage medium. Moisture can cause recording layer warpage resulting in poor data fidelity.

In a typical method for producing a polycarbonate, an aromatic dihydroxy compound such as bisphenol and a diaryl carbonate such as diphenyl carbonate are reacted in a molten state ester exchange. This method is called melt-polycondensation. A polycarbonate copolymer can be produced in a melt-polycondensation by polymerizing diphenyl carbonate and bisphenol A together with other optionally substituted bisphenols, diesters or diacids as comonomers.

In one process for producing substituted bisphenol A (BPA) based copolycarbonates, 2,2-(bis-3-isopropyl-4-hydroxyphenyl)propane is reacted together with bisphenol A and diphenyl carbonate (DPC) and tetramethyl-ammonium hydroxide (TMAH) and NaOH catalyst in a melt transesterification process. This process can require very long reaction times to obtain copolymers with even low molecular weight.

A typical melt transesterification plant utilizes overhead systems that distill off and recycle valuable phenol by-product. Recovery of BPA and DPC monomer by-product is made more difficult when the phenol recycle stream includes other monomers used to form a copolymer. The additional monomers must be separated from the recycle stream. The required separation process is complicated if the monomers have boiling points and vapor pressures similar to other recycle stream components.

Typical melt transesterification plants use a continuous process involving several reactors and polymerizers in series. Several hours can be required to obtain stable operation after a change in a feed composition in a first monomer mix tank. During this period, large quantities of variable composition transition material having ill-defined properties are produced.

There is a need for an improved process for the production of polycarbonate copolymers in a continuous melt reaction system. Additionally, there remains a need for improved processing reagents and for an improved product modified to customize a product polycarbonate for a particular use.

BRIEF DESCRIPTION OF THE INVENTION

The invention provides an improved copolymerization process, copolymerization reagent and product. According to the invention, a method for preparing a copolycarbonate comprises preparing a (A) free hydroxyl-containing polycarbonate and reacting the hydroxyl-containing polycarbonate with a mixture of (B) a symmetrical optionally activated aromatic carbonic acid diester and (C) an optionally substituted aromatic dihydroxy compound, diol or diacid.

In another embodiment, the invention is a copolymerization reagent comprising a mixture of (B) a symmetrical optionally activated aromatic carbonic acid diester and (C) an optionally substituted aromatic dihydroxy compound, diol or diacid.

In another embodiment, the invention comprises a method for preparing a copolycarbonate, comprising reacting an (i) aromatic dihydroxy compound with a (ii) carbonic acid diester to prepare a (A) free hydroxyl-containing polycarbonate and reacting the (A) free hydroxyl-containing polycarbonate with a mixture of a (B) symmetrical optionally activated aromatic carbonic acid diester and an (C) optionally substituted aromatic dihydroxy compound, diol or diacid in a stoichiometric molar ratio of about 0.01 to about 0.75 (C) optionally substituted aromatic dihydroxy compound, diol or diacid to the (i) aromatic dihydroxy compound reacted to form the (A) free hydroxyl-containing polycarbonate.

In still another embodiment, the invention is a copolymer comprising [polycarbonate]$_x$ moieties comprising (i) aromatic dihydroxy moieties and (ii) carbonic acid diester moieties; (B) [symmetrical optionally activated aromatic carbonic acid diester]$_y$ moieties and (C) [optionally substituted aromatic dihydroxy compound, diol or diacid]$_z$ moieties wherein x is 30 to 80 mole percent, y is 10 to 35 mole percent and z is 10 to 35 mole percent of the copolymer.

In still another embodiment, the invention is a method for preparing a copolycarbonate, comprising: preparing a (A) free hydroxyl-containing polycarbonate and sequentially reacting the (A) free hydroxyl-containing polycarbonate in at least a first copolymerization and a second copolymerization with a mixture of a (B) symmetrical optionally activated aromatic carbonic acid diester and an (C) optionally substituted aromatic dihydroxy compound, diol or diacid.

A copolymer comprises (A) [copolycarbonate moieties]$_x$ comprising (i) aromatic dihydroxy moieties and (ii) carbonic acid diester moieties; (B) symmetrical optionally activated aromatic carbonic acid diester moieties; and (C) optionally substituted aromatic dihydroxy compound, diol or diacid moieties in a mole percent ratio of about 0.01 to about 0.75 of (C) optionally substituted aromatic dihydroxy compound, diol or diacid moieties to (i) aromatic dihydroxy moieties.

A system for preparing a copolycarbonate, comprises a first reactor for reacting an (i) aromatic dihydroxy compound with a (ii) carbonic acid diester to produce a copolycarbonate and a contiguous polymerizer for reacting a controlled stoichiometric mixture of a (B) symmetrical optionally activated aromatic carbonic acid diester and an (C) optionally substituted aromatic dihydroxy compound, diol or diacid with the oligomer to produce a copolycarbonate.

Finally, an optical storage media is constructed by preparing a (A) free hydroxyl-containing polycarbonate; reacting the (A) free hydroxyl-containing polycarbonate with a controlled stoichiometric mixture of a (B) symmetrical optionally activated aromatic carbonic acid diester and an (C) optionally substituted aromatic dihydroxy compound, diol or diacid to produce a copolymer; and incorporating the copolymer into an optical structure as a storage media.

DETAILED DESCRIPTION OF THE INVENTION

Typical procedures for producing a polycarbonate include interfacial processes and melt processes. Kaneko et al., U.S. Pat. No. 6,300,459 discloses a process for producing a terminal-blocked aromatic polycarbonate by a melt polycondensing of an aromatic dihydroxy compound and a diphenylcarbonate. In the Kaneko et al. process, a specific carbonate or carboxylic ester is added to the reaction to form a terminal-block polycarbonate product.

Features of the invention will become apparent from the drawings and following detailed discussion, which by way of example without limitation describe preferred embodiments of the present invention.

Figure 1:
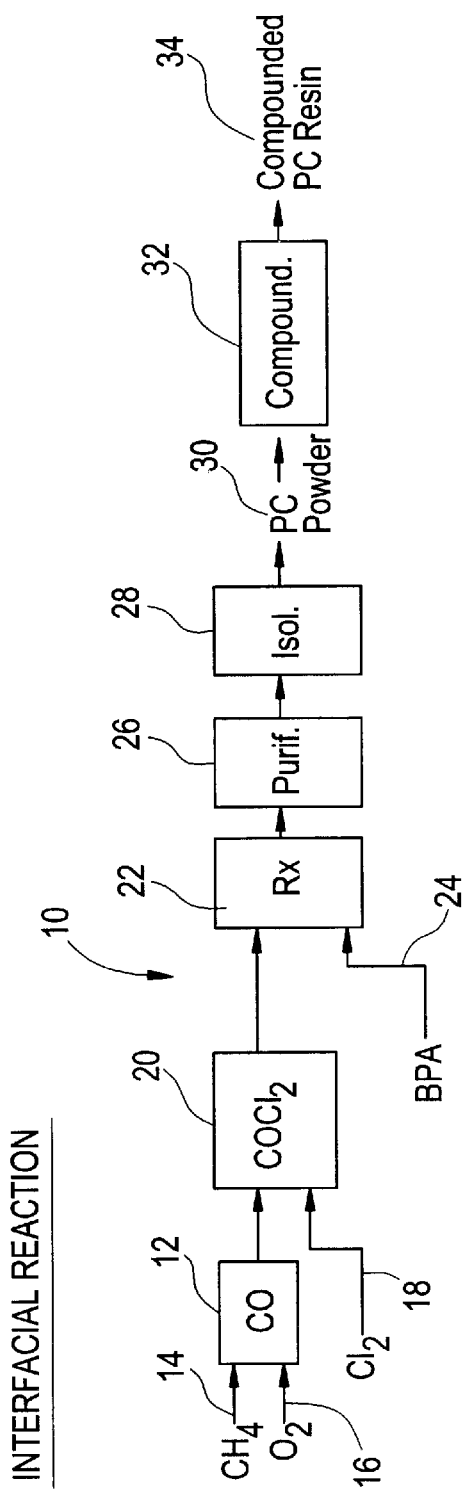
FIG. 1 is a schematic representation of an interfacial reaction with compounding to produce a compounded polycarbonate resin.

FIG. 1 illustrates an overall interfacial process for making polycarbonates and compounding to compositions with valuable properties. As shown in FIG. 1, the process 10 can involve producing carbon monoxide 12 from the reaction of methane 14 with oxygen 16 and combining chlorine 18 with the carbon monoxide to produce phosgene 20. The phosgene is reacted 22 with a dihydric phenol such as bisphenol A (BPA) 24 in an interfacial facility where a polycarbonate product is purified 26 and isolated 28 as a powder 30. The level of free hydroxyl end groups can be varied by adjusting the stoichiometry of dihydric phenol to phosgene. Typically monofunctional phenols or their derivatives are added as chain stoppers. The powder 30 is then compounded 32 to produce a polycarbonate composition 34 with valuable properties.

Figure 2:
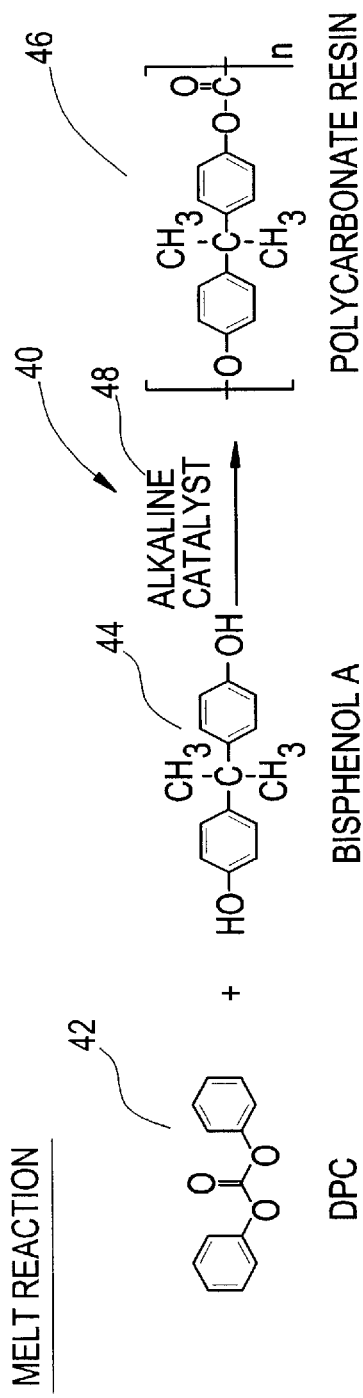
FIG. 2 is a representation of the reaction between diphenyl carbonate and bisphenol A to produce a polycarbonate resin.

As shown in FIG. 2, in a melt process 40, a polycarbonate is produced by (a) a melt polycondensation of an aromatic dihydroxy compound and (b) a carbonic acid diester. In FIG. 2, diphenyl carbonate (DPC) 42 is reacted with BPA 44 to produce a polycarbonate 46 in a transesterfication reaction. The reaction can be carried out in the presence of an alkaline catalyst 48 and in a batch mode or a continuous mode. An apparatus for the reaction can comprise any suitable type of tank, tube or column.

Figure 3:
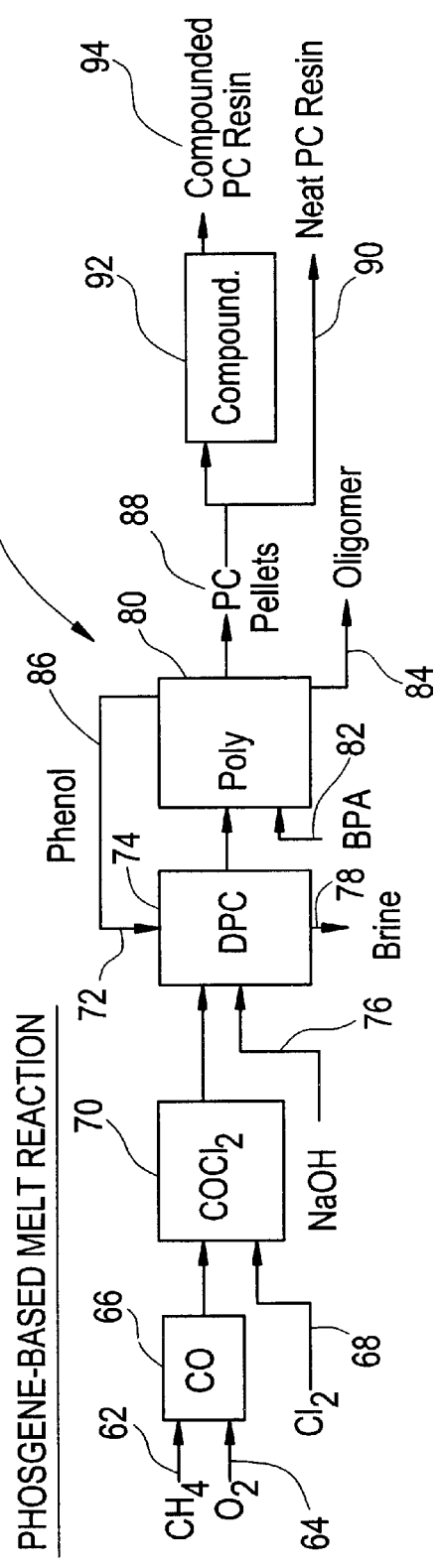
FIG. 3 is a schematic representation of a phosgene-based melt reaction system with compounding to produce a compounded polycarbonate resin.
Figure 4:
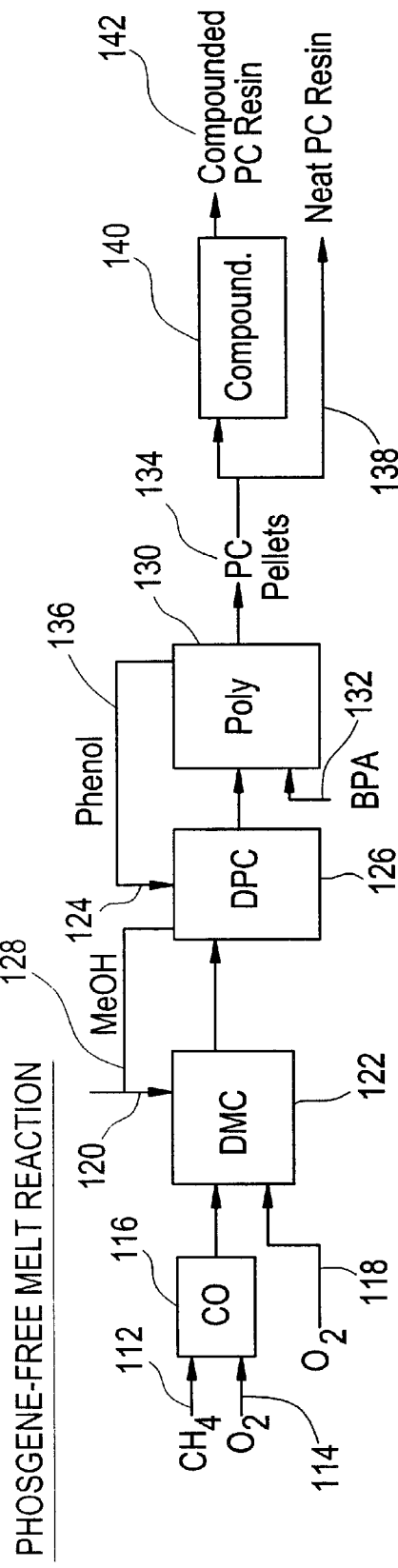
FIG. 4 is a schematic representation of a phosgene-free melt reaction system with compounding to produce a compounded polycarbonate resin.

FIG. 3 and FIG. 4 illustrate melt processes.

FIG. 3 illustrates a phosgene based melt reaction 60. In FIG. 3, methane 62 and oxygen 64 are reacted to form carbon monoxide 66, which is reacted with chlorine gas 68 to produce phosgene (COCl$_2$) 70. The phosgene 70 is reacted with phenol 72 to produce DPC 74 and HCl. The HCl is neutralized by the addition of NaOH 76 to give a brine solution by-product 78 which can be electrolyzed to produce Cl$_2$ or recycled (not shown) for other applications. The DPC 74 is then polymerized 80 with BPA 82 to produce a polycarbonate. A free hydroxyl containing copolycarbonate 84 is produced as an intermediate in this polymerization. A phenol by-product 86 of the polymerization reaction can be recycled to produce further DPC. A polycarbonate pellet product 88 can be used as a neat resin 90 without additives directly in melt shape-forming processes or in the production of thermoplastic blends with other polymers like polyesters or acrylonitrile-butadiene-styrene (ABS) copolymers. Or, the product 88 can be compounded 92 with additives to produce polycarbonate resin compositions 94 with additional valuable properties such as improved flame retardence, light or thermal stability, or mold release.

FIG. 4 illustrates a phosgene-free melt reaction 110 in which methane 112 is oxidized 114 to carbon monoxide 116, which is reacted with additional oxygen 118 and methanol 120 to form dimethyl carbonate (DMC) 122. DMC 122 is then reacted with phenol 124 to produce DPC 126 and a methanol by-product, which is then recycled 128 to produce further DMC 122. As in FIG. 3, the DPC 126 is polymerized 130 with BPA 132 and extruded (not shown) to produce polycarbonate pellets 134. A phenol by-product 136 of the polymerization reaction is typically recycled to produce further DPC 126. The polycarbonate pellets 134 can be used as neat resins 138 without any added additives directly in melt shape-forming processes or in the production of thermoplastic blends with other polymers like polyesters or acrylonitrile-butadiene-styrene (ABS) copolymers. Or, the pellets 134 can be compounded 140 with additives to produce polycarbonate resin compositions 142 with additional valuable properties such as improved flame retardence, light, thermal stability or mold release.

The invention provides an integrated method of making a copolycarbonate by reacting a (A) free hydroxyl-containing polycarbonate with a copolymerization composition comprising a mixture of different species, including at least (B) a symmetrical optionally activated aromatic carbonic acid diester and (C) an optionally substituted aromatic dihydroxy compound, diol or diacid. In this application, the term "polycarbonate" includes a polycarbonate oligomer and the term "copolycarbonate" or "polycarbonate copolymer" is the reaction product of a polycarbonate or polycarbonate oligomer with the copolymerization reagent (B) and (C).

Free Hydroxyl-Containing Polycarbonate The (A) free hydroxyl-containing polycarbonate can be produced by a melt reaction, an interfacial reaction, a solid phase reaction, a thin film reaction or the like. A reclaimed polymer can also be used as the polycarbonate. Also, Kaneko et al., U.S. Pat. No. 6,300,459 discloses a process for producing a suitable (A) free hydroxyl-containing polycarbonate by the reaction of an aromatic polycarbonate with an active-hydrogen compound in the presence of a transesterification catalyst. In FIG. 1, excess dihydric phenol can be used to increase the content of phenolic hydroxyl end groups. In FIG. 2, free-hydroxyl content of the resulting melt polycarbonate can be controlled by varying the ratio of DPC to BPA. Increasing the ratio can result in a polycarbonate having more "capped" chain ends. Decreasing the ratio can result in a polycarbonate having more "uncapped" or free hydroxyl end groups.

The polycarbonate (A) can be a mixture of polycarbonates. For example, a polymer produced by a melt reaction can be mixed with a polymer produced by an interfacial reaction or with a polymer obtained through recovery of molded disks. Generally, the higher free hydroxyl content of the polycarbonate, the greater its activity in the process of the invention. The hydroxyl content can be controlled by controlling reactant stoichiometry. Or, the content can be controlled by melt equilibrating a polycarbonate having a low level of free hydroxyl groups with a polycarbonate having a higher level.

The polycarbonate may be any type of polycarbonate, and can be formed by a melt transesterification, solid phase, thin film or interfacial processes to form a single polycarbonate or a mixture of different polymers. Preferably, the polycarbonate if formed by a melt transesterification process. The reaction can be carried out by either a batch mode or a continuous mode in conjunction with reaction with the copolymerization reagent. The apparatus in which the process is carried out can be any suitable type of tank, tube, extruder, column or the like.

In preparing the polycarbonate, usually about 0.8 mole to about 1.30 moles of carbonic diester are utilized for every 1 mole of the aromatic dihydroxy compound. In one embodiment, about 1.01 moles to about 1.20 moles of the carbonic diester is utilized. The ratio of carbonic acid diester to aromatic dihydroxy compound can be decreased or increased to result in a polycarbonate having a higher or lower content of reactive free hydroxyl end groups.

Copolymerization Reagent The copolymerization reagent of the invention comprises a mixture of a (B) symmetrical optionally activated aromatic carbonic acid diester and an (C) optionally substituted aromatic dihydroxy compound, diol, or diacid.

As used herein, the term "symmetrical optionally activated aromatic carbonic acid diester" refers to compounds containing two phenolic groups linked through a carbonate bridge, with each phenol group being optionally substituted with the same alkyl, aryl or aralkyl substituent at any position. Many of the symmetrical aromatic carbonic acid diesters can be represented by the general formula:

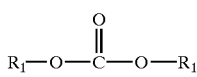

wherein $R_1$ is selected from the group consisting of phenyl, aryl, and arylalkyl groups. $R_1$ may optionally be substituted with activating groups. Many of these symmetrical activated aromatic carbonates can be represented by the general formula:

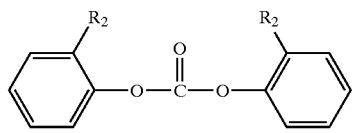

wherein $R_2$ is the electronegative substituent. Preferred electronegative substituents are carbonyl-containing groups, nitro groups, and halo groups. In one embodiment the carbonic acid diester is a diphenyl carbonate with activated ortho-electron withdrawing groups with the structure as shown by the general formula:

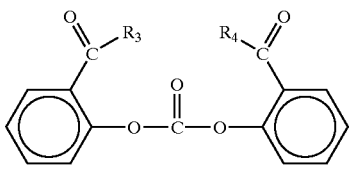

wherein $R_3$ and $R_4$ are selected from the group consisting of alkoxy, phenoxy, benzoxy, aryloxy, phenyl and aryl groups. In one embodiment, $R_3$ and $R_4$ are selected from the group consisting of methoxy, ethoxy, n-propoxy, benzoxy, phenoxy, and phenyl.

Symmetrical activated aromatic carbonates of this type can be synthesized by the reaction of an appropriate ortho-substituted phenol with phosgene.

Symmetrical activated aromatic carbonates for use in compositions and methods in accordance with the invention can also be made either by reaction of two equivalents of an appropriate "activated" or ortho-substituted phenyl chloroformate with a bisphenol, such as bisphenol A, or by reaction of a bis-chloroformate with two equivalents of an "activated" or appropriate ortho-substituted phenol. Where bisphenol A is used, the resulting composition has the following general formula:

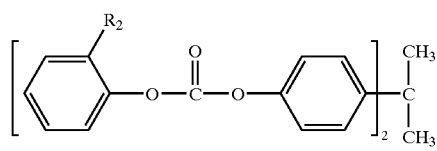

wherein $R_2$ is as defined above.

Specific examples of symmetrical activated aromatic carbonates that may be used in the compositions and methods of the invention are summarized in TABLE 1.

TABLE 1

Examples of Symmetrical Activated Carbonates

| Structure | Name (abbreviation) | Data |
|---|---|---|
| MeO-...-OMe (bis-methyl salicylate carbonate structure) | Bis-methyl salicylate carbonate (bMSC) | MW = 330 mp 109° C.[i] |

TABLE 1-continued

Examples of Symmetrical Activated Carbonates

| Structure | Name (abbreviation) | Data |
|---|---|---|
| | BPA-bis-methylsalicylate carbonate | MW = 572 |
| | Bis-ethyl salicylate carbonate (bESC) | MW = 358 |
| | Bis-propyl salicylate carbonate (bPrSC) | MW = 386<br>mp = 57–58° C. |
| | bis-2-benzoylphenyl carbonate | MW = 422<br>mp = 111–112° C. |
| | Bis-phenyl salicyl carbonate (bPhSC) | MW = 454 |
| | Bis-benzyl salicyl carbonate (bBSC) | MW = 482<br>mp = 68.5–71° C. |

As used in the specification and claims of this application, the term "optionally substituted aromatic dihydroxy compound, diol or diacid" refers to compounds containing two or more phenolic, hydroxyl or carboxylic acid groups. The phenol groups can be substituted or unsubstituted, provided that they do not include electronegative and therefore activating substituents at the ortho position.

Suitable aromatic dihydroxy compounds, diols and diacids can be represented by the formula:

$$A_xG_y$$

wherein A is a $C_{1-20}$ polymethylene, $C_{2-20}$ alkylene or alkylidene, $C_{5-36}$ cycloalkylene or cycloalkylidene, $C_{6-36}$ arylene or alkylarylene, or $C_{6-36}$ arylalkylene and x is 0 or an integer, wherein G is a monovalent $C_6$–$C_{30}$ hydrocarbon having at least one hydroxyl or carboxylic acid group bonded directly to an alkyl group or aromatic or cycloaliphatic ring and y is an integer greater than or equal to 1, and wherein each G may be the same or different.

The optionally substituted aromatic dihydroxy compound can be a bisphenol represented by the formula:

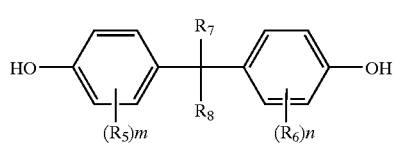

wherein $R_5$ and $R_6$ are independently selected from $C_1$–$C_6$ alky, $C_3$–$C_6$ cycloalkyl, or phenyl, m and n are integers independently selected between 0 and 4, and $R_7$ and $R_8$ are independently selected from hydrogen, $C_1$–$C_{12}$ alkyl, or phenyl, or $R_7$ and $R_8$ are taken together to form a $C_3$–$C_{12}$ cycloalkyl.

The molar ratio of (B) aromatic carbonic diester to (C) the aromatic dihyroxy compound, diol or diacid can be controlled to determine end product properties. About 0.25 mole to about 3.0 moles of (B) carbonic diester can be utilized for every 1 mole of the (C) aromatic dihydroxy compound, diol or diacid. A preferred ratio depends upon the desired final molecular weight and the desired endcap level as well as upon the type of (C) and upon the endcap and free hydroxyl level of the polycarbonate (A). A desired molar ratio is 0.75 to 1.25 (B) to (C) and a preferred molar ratio is 1.0 to 1.08 (B) to (C). Increased (B) carbonic acid diester level increases endcap level and reduces the free hydroxyl level of the final copolymer. Lessened (B) carbonic acid diester level decreases endcap level. If a diacid is component (C), additional (B) carbonic acid diester is required to drive the reaction due to the formation of intermediates. A higher free hydroxyl level of the (A) polycarbonate provides greater reactivity, but in general a greater amount of carbonic acid diester will need to be added to achieve a high endcap level of the final copolymer.

Examples of the aromatic dihydroxy compound include bis(hydroxyaryl) alkanes such as bis(4-hydroxyphenyl) methane; 1,1-bis(4-hydroxyphenyl)ethane; 2,2-bis(4-hydroxyphenyl)propane (also known as bisphenol A or BPA); 2,2-bis(4-hydroxyphenyl)butane; 2,2-bis(4-hydroxyphenyl)octane; bis(4-hydroxyphenyl) phenylmethane; 2,2-bis(4-hydroxy- 1-methylphenyl) propane; 1,1-bis(4-hydroxy-t-butylphenyl) propane; and 2,2-bis(4-hydroxy-3-bromophenyl)propane; bis (hydroxyaryl)cycloalkanes such as 1,1-(4-hydroxyphenyl) cyclopentane and 1,1-bis(4-hydroxyphenyl)cyclohexane; dihydroxyaryl ethers such as 4,4'-dihydroxydiphenyl ether and 4,4'-dihydroxy-3,3'-dimethylphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; and dihydroxydiaryl sulfones such as 4,4'-dihydroxydiphenyl sulfone and 4,4'-dihydroxy-3,3'-dimethyldiphenyl sulfone. In one embodiment, the aromatic dihydroxy compound is BPA.

Examples of the carbonic acid diester (ii) include diphenyl carbonate; ditolyl carbonate; bis(chlorophenyl) carbonate; bis(methyl salicyl)carbonate; m-cresyl carbonate; and dinaphthyl carbonate. In one embodiment, diphenyl carbonate (DPC) is used.

The carbonic diester component may also contain a minor amount, e.g., up to about 50 mole % of a dicarboxylic acid or its optionally activated diester variant. Typical organic acids are terephthalic acid, 1,12-dodecyldioic acid, sebacic acid, hydroxy-cinnamic acid, and diphenyl isophthalate, to prepare polyesterpolycarbonates.

The method of adding the copolymerization reagent to polycarbonate is not specially limited. For example, the copolymerization reagent can be added to the polycarbonate as a reaction product in a batch reactor or a continuous reactor system. In one embodiment, the copolymerization reagent is added by means of a static mixer placed into a melt stream at an addition points, for example at 176, 178 or 180 of FIG. 5. In other embodiments, the copolymerization reagent is fed directly as a melt stream into a polymerizer or into a feeding or inlet port of an extruder for example as shown at 172 of FIG. 5 as hereinafter described.

In one embodiment, the copolymerization reagent is added to a polycarbonate oligomer after an initial oligomerization in one or more CSTR reactors. The reaction can be a continuous process carried out in contiguous reactors. This process provides a controlled modification of properties and build-up of polymer molecular weight. In one embodiment, the copolymerization reagent is added after initial continuously stirred tank reactors (CSTR's) (oligomerization section) of a continuous melt reaction system, wherein the weight average molecular weight, Mw, of the polycarbonate oligomer is between about 4,000 to 40,000 Dalton, desirably 6,000 to 30,000 and preferably 7,500 to 25,000 Dalton. In this embodiment, the copolymerization reagent can be added between CSTR's in a polymerizing section or directly into one CSTR located downstream from a first CSTR or into a final compounding extruder.

Optional Terminators/End-capping Agents In one embodiment of the melt process, optional terminators or end-capping agents may be used. Examples of terminators include phenol, methyl salicylate, p-tert-butylphenol, p-cumylphenol, octylphenol, nonylphenol, dodecylphenol, meta-pentadecylphenol and other end capping agents. These terminators and endcappers may be added at any stage of the reaction including monomer mixing, oligomerization, and polymerization. The terminators and endcappers may also be added together with one or more components of the copolymerization reagent.

Optional Branching Agents In one embodiment of the process, branching agents are used as needed. Branching agents are well-known and may comprise polyfunctional organic compounds containing at least three functional groups, which may be hydroxyl, carboxyl, carboxylic anhydride, and mixtures thereof. Specific examples include trimellitic anhydride, tris-p-hydroxy phenyl ethane, isatin-bis-phenol, tris-phenol TC (1,3,5-tris((p-hydroxyphenyl) isopropyl)benzene), tris-phenol PA (4(4(1,1-bis(p-hydroxyphenyl)-ethyl) alpha, alpha-dimethyl benzyl) phenol, and benzophenone tetracarboxylic acid. These agents can be added at any stage of the reaction including monomer mixing, oligomerization, and polymerization. The agents can also be added together with one or more components of the copolymerization reagent.

Optional catalysts The polycarbonate process can be conducted in the presence of a catalyst to promote the transesterification reaction. Examples include alkali metals and alkaline earth metals by themselves or as oxides, hydroxides, amide compounds, alcoholates, and phenolates. Other catalysts include basic metal oxides such as ZnO, PbO, and $Sb_2O_3$, organotitanium compounds, soluble manganese compounds, nitrogen-containing basic compounds and acetates of calcium, magnesium, zinc, lead, tin, manganese, cadmium, and cobalt, and compound catalyst systems such as a nitrogen-containing basic compound and a boron compound, a nitrogen-containing basic compound and an alkali (alkaline earth) metal compound, a phosphorus-containing basic compound and an alkali (alkaline earth) metal compound, and a nitrogen-containing basic compound, an alkali (alkaline earth) metal compound, and a boron compound.

In one embodiment of the invention, the transesterification catalyst is a quaternary ammonium compound or a quaternary phosphonium compound. Non-limiting examples of these compounds include tetramethyl ammonium hydroxide, tetramethyl ammonium acetate, tetramethyl ammonium fluoride, tetramethyl ammonium tetraphenyl borate, tetraphenyl phosphonium fluoride, tetraphenyl phosphonium tetraphenyl borate, tetrabutyl phosphonium hydroxide, tetrabutyl phosphonium acetate, and dimethyl diphenyl ammonium hydroxide.

The above-mentioned catalysts can each be used alone, or, depending on the intended use, two or more types can be used in combination. When more than one catalyst is employed, each may be incorporated into the melt at a different stage of the reaction. One or more catalysts or a portion thereof may be added together with the copolymerization reagent.

The appropriate level of catalyst will depend in part on how many catalysts are being employed, e.g., one or two. In general, the total amount of catalyst is usually in the range of about $1 \times 10^{-8}$ to about 1.0 mole per mole of the dihydroxy compound. In one embodiment, the level is in the range of about $1 \times 10^{-5}$ to about $5 \times 10^{-2}$ mole per mole of dihydroxy compound. When more than one catalyst is employed, each may be incorporated into the melt at a different stage of the reaction. One or more catalysts or a portion thereof may be added together with the copolymerization reagent.

Other optional components in the polycarbonate The polycarbonate obtained in the process of the invention may contain a catalyst quencher, heat stabilizer, an ultraviolet absorbent, a mold releasing agent, a colorant, an anti-static agent, a lubricant, an anti-fogging agent, a natural oil, a synthetic oil, a wax, an organic filler or an inorganic filler. These other optional components will generally be added after the copolymerization reagent is added.

Figure 5:
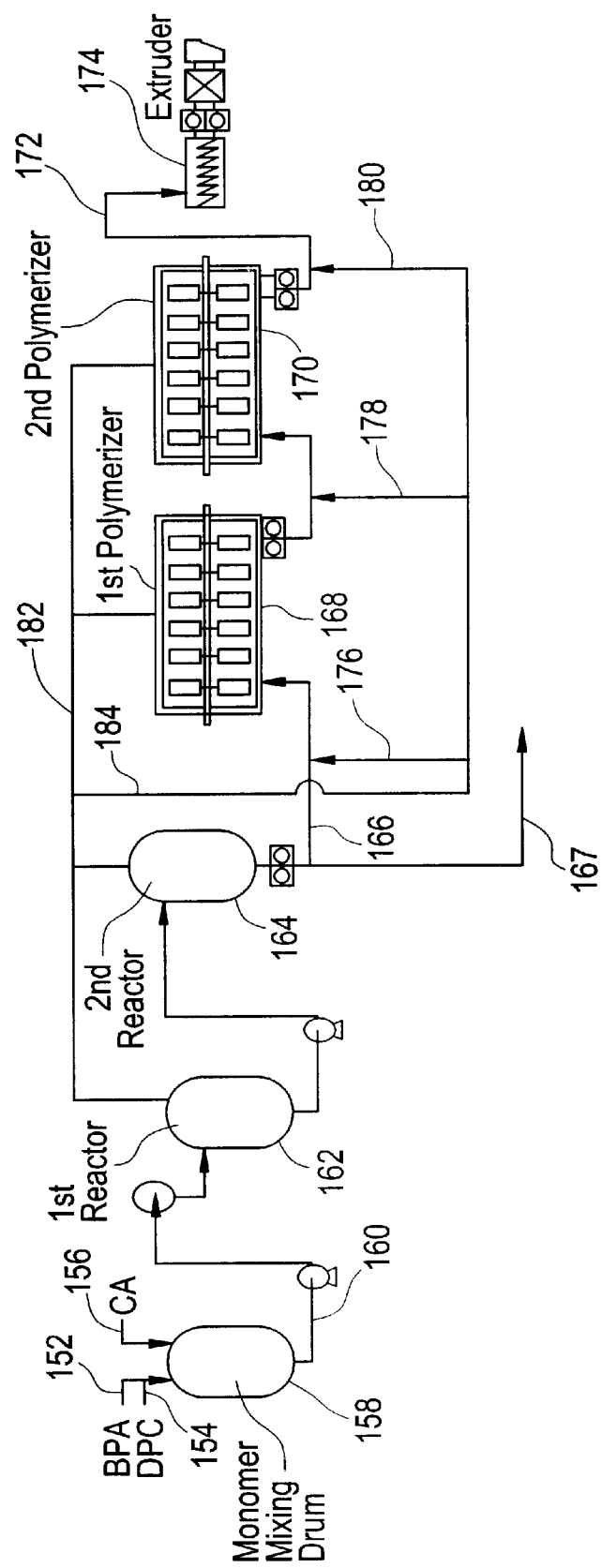
FIG. 5 is a schematic representation of an integrated continuous reaction system for preparing a copolycarbonate.

Contiguous polymerization Reaction The reaction illustrated in FIG. 5 is a continuous process involving multiple contiguous constant stir reactors (CSTR's) and one or more finishing reactors. The FIG. 5 CSTR's are monomer mixing and oligomerization reactors and polymerizers. In this specification, the term "contiguous" means next to or near in sequence, touching or connected throughout in an unbroken sequence. FIG. 5 shows a continuous solvent-free process in a contiguous system 150 to produce a final copolycarbonate with desirable properties such as high optical clarity and transparency and low particulates. In the FIG. 5 system, BPA and DPC are melt transesterified to produce a polycarbonate. The DPC monomer may be prepared by either a phosgene-based (FIG. 3) or "phosgene-free" (FIG. 4) process. In a continuous process, BPA and DPC can be mixed together in the molten state and then oligomerized in one or more CSTR's and finally polymerized to a high molecular weight in additional CSTR's. Transesterfication catalysts can be used to catalyze the oligomerization or polymerization processes, and they are in general added in the initial reaction stages to the monomer mixing drum and/or the CSTR reactors. In general, the temperature is increased and the pressure is decreased as the molten material progresses from the initial monomer mixing drum to the final polymerizer. The phenol by-product is distilled to the "overhead" system and then a purified by additional distillation before it is recycled for use in the production of DPC.

With specific reference to FIG. 5, BPA 152 and DPC 154 and a basic catalyst 156 are continuously supplied to a monomer mixing drum 158. The reaction in drum 158 is conducted at a temperature typically of about 130° C. and under a nitrogen blanket at atmospheric pressure. The reaction produces a uniform melt mixture 160. The melt mixture is successively supplied to two continuous stir reactors 162, 164, each equipped with an agitation impeller having a vertical rotary shaft (not shown). Reaction temperature in reactor 162 is about 150 to 260° C. and nitrogen pressure is about 300 to 6 mmHg. Reaction temperature in reactor 164 is about 180 to 300° C. and nitrogen pressure is about 50 to 1 mmHg. The reactor 164 discharges a molten copolycarbonate 166 having an intrinsic viscosity of about 0.1 to 0.4 dL/g.

The production line with oligomer 166 can split into two or more finishing lines 166 and 167 each consisting of horizontally agitated polymerizers (not shown for line 167). Polymerizers 168 and 170 shown in FIG. 5, are horizontal high-viscosity melt kneading apparatus that have one or more horizontal rotary shafts with impellers (not shown). The oligomer feed 166 forms a reaction melt, which is stoked up or pushed out by the impeller so that the surface of the melt is continuously refreshed. Reaction temperature in polymerizer 168 is about 240 to 320° C. and the pressure is about 20 mmHg or lower. The reaction temperature in polymerizer 170 is about 260 to 320° C. and the pressure is about 10 mmHg or lower. The molten copolycarbonate 172 emerging from the final polymerizer 170 can be directly pelletized. Optionally as shown in FIG. 5, the copolycarbonate 172 is compounded on-line in extruder 174.

The copolymerization reagent of the invention can be used in the FIG. 5 process and system to rapidly react with terminal hydroxyl groups of a copolycarbonate product 166 to incorporate optionally substituted aromatic dihydroxy, diol or diacid moieties into a product copolymer. In FIG. 5, the copolymerization reagent can be added by means of a static mixer placed into the melt stream at any of addition points 176, 178 or 180. The copolymerization reagent can be fed directly as a melt stream by means of a pipe into one of the polymerizers at 176 or 178 or introduced into a feeding or inlet port of the extruder at 180.

The copolymerization reagent of the invention rapidly reacts with terminal hydroxyl groups of the polycarbonate to incorporate optionally substituted aromatic dihydroxy compound, diol or diacid moieties into the product copolymer. The copolymerization reagent can be added by means of a static mixer placed into the melt stream at any of the addition points 176, 178 and/or 180. The copolymerization reagent may be fed directly as a melt stream by means of a pipe into one of the polymerizers or into a feeding or inlet port of the extruder 174. It is particularly favorable to introduce the copolymerization reagent after the production line splits to 167 so that copolymers can be produced on one production line from 166 and homopolymer resins can continue to be produced in an undisturbed manner on the adjacent production line from 167.

By-product phenols can be removed from the polycarbonate copolymer by distillation to overhead system 182 using for example, freeze traps with chilled water as coolant). The phenols can be condensed and used to expedite the copolymerization reaction to improve yield. However, reaction of the (B) activated aromatic carbonic acid diester generates ortho-substituted phenols such as the following formula:

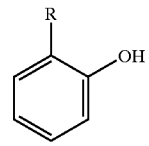

These ortho-substituted phenols are less reactive and if recycled 182 to the initial DPC preparation reactions, can cause an incomplete extent of reaction or undesirable side reactions. The ortho-substituted phenols have boiling points that are typically much lower than phenol, DPC and BPA, so the various undesirable overhead stream components are usually separated by distillation columns installed after the overhead system condenser units. In one embodiment of the invention, the ortho-substituted phenol by-product of the following formula is recovered 184 from the overhead system and reused to prepare new copolymerization reagent.

The polycarbonate copolymers can still contain small amounts of unrecovered phenols and unreacted copolymerization reagent along with by-products of side reactions to the copolymerization reaction, e.g. products with terminal 2-(alkoxycarbonyl)phenyl groups and the like. The level of unrecovered phenols, unreacted copolymerization reagent and by-product can be reduced after the copolymerization reaction by typical means for improving the devolatization of unreacted monomers and by-products, for example, by decreasing the pressure, increasing the residence time and continually renewing a high surface area. The amount of terminal 2-(alkoxycarbonyl)phenyl groups can be reduced by decreasing the ratio of (B) to (C) in the copolymerization reagent and by allowing for adequate equilibration of the copolymerization reagent with the copolycarbonate. Equilibration can be favored by adding the copolymerization reagent to the oligomer melt stream by means of a static mixer at 176, 178 or 180 or by increasing residence time for the reaction of copolymerization reagent with the copolycarbonate. Residence time can be increased by reducing throughput rate of the production process or simply by adding the copolymerization at an earlier addition point in the process, for example at 176. The polycarbonate copolymer of the invention can contain less than 500 ppm of electron-withdrawing ortho-substituted residuals such as ortho-substituted phenol, preferably less than 100 ppm and less than 500 ppm of unreacted copolymerization reagent, preferably less than 100 ppm. The polycarbonate copolymer can contain less than 5000 ppm terminal 2-(alkoxycarbonyl) phenyl groups.

The invention provides an integrated method of making a copolycarbonate by reacting at least one (A) free hydroxyl-containing polycarbonate with a copolymerization composition comprising a mixture of different species, including at least (B) one symmetrical optionally activated aromatic carbonic acid diester and (C) and one optionally substituted aromatic dihydroxy compound, diol or diacid. Further, the invention provides a method of making a copolycarbonate that uses a copolymerization reagent that includes (B) and (C). The copolymerization reagent permits "growing" the polymer chain in a controlled manner to produce a copolymerization product with targeted properties. The method produces a customized copolycarbonate product. In one embodiment, the product comprises a copolymer comprising [polycarbonate]$_x$ moieties comprising (i) aromatic dihydroxy moieties and (ii) carbonic acid diester moieties; (B) [symmetrical optionally activated aromatic carbonic acid diester]$_y$ moieties and (C) [optionally substituted aromatic dihydroxy compound, diol or diacid]$_z$ moieties wherein x is 20 to 92 mole percent, y is 4 to 40 mole percent and z is 4 to 40 of the copolymer. Desirably, the copolymer comprises the moieties in a relationship of x=40 to 70, y=15 to 30 and z=15 to 30 mole percent of the copolymer respectively and preferably, the copolymer comprises the moieties in a relationship of x=46 to 60, y=20 to 27 and z=20 to 27 mole percent of the copolymer.

Additionally, the continuous and contiguous FIG. 5 method and system obtains and maintains a stable reaction state in a reduced period of operation when operated according to the process of the present invention. The system is brought to a steady-state that does not fluctuate as a function of time to produce in-spec and sellable polycarbonate and a variety of different polycarbonates in less time than conventional operations. Different products can be produced by rapidly switching back and forth between the steady states or conditions of stable operation simply by modifying the mixture of (B) and (C) and or its addition site.

Adding (B) a symmetrical optionally activated aromatic carbonic acid diester and (C) an optionally substituted aromatic dihydroxy compound, diol, or diacid together as a copolymerization reagent surprisingly results in rapid incorporation into the melt polycarbonate. The addition of the copolymerization reagent permits controlled modification of product properties and provides for a polycarbonate of controlled final molecular weight. Adding the copolymerization reagent to an oligomer polycarbonate provides a polycarbonate product with customized valuable properties. Further, downstream addition of the copolymerization reagent in a continuous process reduces recovery difficulties because the additional (B) and (C) monomers need only be separated from the downstream recycle In one example of the invention, a polycarbonate (A) is reacted with a copolymerization reagent to impart valuable properties for an optical storage media application. Reduced melt viscosity, water affinity and maintained transparency and heat resistance birefringence of product are desirable for an optical storage media applications. Polycarbonate copolymers containing resorcinol typically have a lower melt viscosity than polycarbonate homopolymers of the same molecular weight. Resorcinol polyester-polycarbonate copolymers also have improved resistance to degradation by ultraviolet radiation and resistance to loss of gloss. These properties collectively can be designated "weatherability." Copolymers and blends containing certain ortho-substituted bisphenol A moieties and ortho-substituted spirobiindane moieties exhibit superior dimensional stability when exposed to water or moisture while maintaining good processibility and low birefringence. Increased solvent resistance and chemical resistance are desirable properties in many telecommunications, automotive and medical applications. Hydroquinone, biphenol, bisphenol S, isoterephthalic and terephthalic acid moieties can be introduced into the polycarbonate polymers to attain these properties.

In another exemplary embodiment, valuable properties can be imparted to a polycarbonate to customize the polymer for use in an injection molding process for the production of an optical storage medium or appliance, automotive component or telecommunication component. Also, the polycarbonate can be modified for use in an extrusion process for the production of a profile, solid sheet, multi-wall sheet or corrugated sheet.

The following EXAMPLES are illustrative and should not be construed as a limitation on the scope of the claims unless a limitation is specifically recited.

In the EXAMPLES, molecular weight Mw and Molecular number Mn are measured by GPC analysis of 1 mg/ml polymer solutions in methylene chloride versus polystyrene standards and corrected for polycarbonate.

The "copolymerization" EXAMPLEs described below were performed using polycarbonates A–F shown in TABLE 2. These polycarbonates were made from the reaction of BPA and DPC in continuous melt reaction systems as shown in FIG. 5. The polycarbonates were removed at different stages of the reaction corresponding to addition points 176, 178, and 180, and thus they vary in their molecular weight. In one case, a lower ratio of DPC to BPA was used in order to obtain a higher molecular weight polycarbonate with lower endcap level, Polycarbonate A.

TABLE 2

| Polycarbonate | Mw (g/mole) | Mn (g/mole) | Pd | IV (dl/g) | Endcap Level (%) | Free OH (ppm) | Tg (° C.) |
|---|---|---|---|---|---|---|---|
| A | 19472 | 8624 | 2.26 | 0.413 | 44 | 2209 | 145.9 |
| B | 8111 | 4050 | 2.00 | 0.185 | 52.1 | 4020 | |
| C | 22956 | 10097 | 2.27 | 0.487 | 69.8 | 1016 | 147.6 |
| D | 8921 | 4535 | 1.97 | 0.209 | 41 | 4424 | |
| E | 24435 | 10962 | 2.23 | 0.530 | 74.9 | 779 | 147.7 |
| F | 18349 | 7595 | 2.42 | 0.362 | 93.3 | 300 | 141.7 |

EXAMPLE 1

A batch reactor tube was charged with 25 g of polycarbonate A, 3.3470 g ($9.83*10^{-3}$ mole) di-(ortho-sec-butyl) bisphenol acetone (dosbBPA) and 3.2464 g ($9.83*10^{-3}$ mole) bis-(methyl salicyl)carbonate (bMSC) under nitrogen. The polycarbonate was then heated to a temperature of 270° C. and stirred for 20 minutes. After the melt mixing stage, a vacuum was applied to the system to a pressure of 0.5 millibar. The reaction was continued for an additional 40 minutes. The finished polycarbonate polymer was then sampled from the reaction tube, the results of which are shown in Table 3.

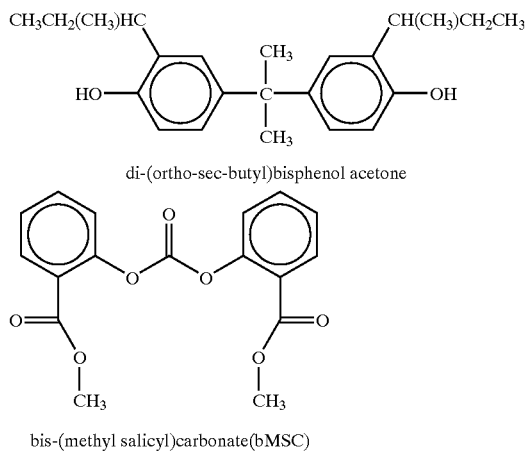

di-(ortho-sec-butyl)bisphenol acetone bis-(methyl salicyl)carbonate(bMSC)

EXAMPLE 2

The procedure of EXAMPLE 1 was repeated but instead of using 3.3470 g ($9.83*10^{-3}$ mole) di-(ortho-sec-butyl) bisphenol acetone (dosbBPA) and 3.2464 g ($9.83*10^{-3}$ mole) bis-(methyl salicyl)carbonate (bMSC), 1.6735 g ($4.915*10^{-3}$ mole) di-(ortho-sec-butyl)bisphenol acetone (dosbBPA) and 1.6232 g ($4.915*10^{-3}$ mole) bis-(methyl salicyl)carbonate (bMSC) were used.

EXAMPLE 3

The procedure of EXAMPLE 1 was repeated but instead of continuing the reaction for 40 minutes, the reaction was continued for 20 minutes.

EXAMPLE 4

The procedure of EXAMPLE 1 was repeated but instead of using 3.3470 g ($9.83*10^{-3}$ mole) di-(ortho-sec-butyl) bisphenol acetone (dosbBPA) 1.6330 g ($9.83*10^{-3}$ mole) Terephthalic acid was added to the polymer.

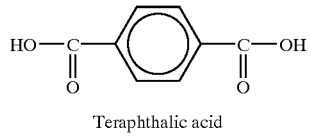

Teraphthalic acid

EXAMPLE 5

The procedure of EXAMPLE 1 was repeated but instead of using 3.3470 g ($9.83*10^{-3}$ mole) di-(ortho-sec-butyl) bisphenol acetone (dosbBPA), 1.0824 g ($9.83*10^{-3}$ mole) resorcinol was added to the polymer.

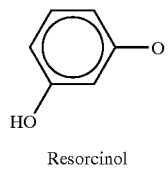

Resorcinol

EXAMPLE 6

The procedure of EXAMPLE 1 was repeated but instead of using 3.3470 g ($9.83*10^{-3}$ mole) di-(ortho-sec-butyl) bisphenol acetone (dosbBPA) and 3.2464 g ($9.83*10^{-3}$ mole) bis-(methyl salicyl)carbonate (bMSC), 4.3288 g of a pre-thermally equilibrated sample of Resorcinol/bis-(methyl salicyl)carbonate was added to the polymer.

The pre-thermally equilibrated sample consisted of a 1/1 mole resorcinol/bis-(methyl salicyl)carbonate mixture which was reacted for 10 minutes at 180° C. on the presence of $250*10^{-6}$ mole TMAH per mole resorcinol.

EXAMPLE 7

The procedure of EXAMPLE 1 was repeated but instead of using 3.3470 g ($9.83*10^{-3}$ mole) di-(ortho-sec-butyl) bisphenol acetone (dosbBPA), 1.0824 g ($9.83*10^{-3}$ mole) hydroquinone was added to the polymer.

Hydroquinone

EXAMPLE 8

The procedure of EXAMPLE 1 was repeated but instead of using 3.3470 g ($9.83*10^{-3}$ mole) di-(ortho-sec-butyl) bisphenol acetone (dosbBPA), 1.8304 g ($9.83*10^{-3}$ mole)

biphenol or [1,1'-Biphenyl]-4,4'-diol was added to the polymer.

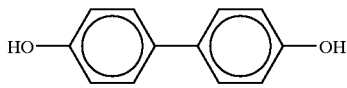

Biphenol or [1,1'-Biphenyl]-4,4'-diol

EXAMPLE 9

The procedure of EXAMPLE 1 was repeated but instead of using 3.3470 g ($9.83*10^{-3}$ mole) di-(ortho-sec-butyl) bisphenol acetone (dosbBPA), 2.4602 g ($9.83*10^{-3}$ mole) bisphenol sulfone or 4,4'-Sulfonyldiphenol was added to the polymer.

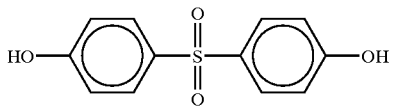

bisphenol sulfone or 4,4'-Sulfonyldiphenol

EXAMPLE 10

The procedure of EXAMPLE 1 was repeated but instead of using polycarbonate A, polycarbonate C was used.

EXAMPLE 11

The procedure of EXAMPLE 1 was repeated but instead of using polycarbonate A, polycarbonate E was used.

EXAMPLE 12

The procedure of EXAMPLE 1 was repeated but instead of using polycarbonate A, polycarbonate B was used.

EXAMPLE 13

The procedure of EXAMPLE 1 was repeated but instead of using polycarbonate A, polycarbonate D was used.

EXAMPLE 14

The procedure of EXAMPLE 1 was repeated except that 5.4120 g ($49.2*10^{-3}$ mole) hydroquinone and 16.2323 g ($49.2*10^{-3}$ mole) bis-(methyl salicyl)carbonate (bMSC) were added to the polymer.

EXAMPLE 15

The procedure of EXAMPLE 1 was repeated except that 5.4120 g ($49.2*10^{-3}$ mole) hydroquinone and 16.2323 g ($49.2*10^{-3}$ mole) bis-(methyl salicyl)carbonate (bMSC) were added to the polymer.

EXAMPLE 16

The procedure of EXAMPLE 1 was repeated except that 4.5762 g ($24.56*10^{-3}$ mole) biphenol and 8.1161 g ($24.56*10^{-3}$ mole) bis-(methyl salicyl)carbonate (bMSC) were added to the polymer.

EXAMPLE 17

The procedure of EXAMPLE 1 was repeated except that 7.3219 g ($39.3*10^{-3}$ mole) biphenol or [1,1'-Biphenyl]-4,4'-diol and 12.9858 g ($39.3*10^{-3}$ mole) bis-(methyl salicyl) carbonate (bMSC) were added to the 25 g of polycarbonate A instead of 3.3470 g ($9.83*10^{-3}$ mole) di-(ortho-sec-butyl) bisphenol acetone (dosbBPA) and 3.2464 g ($9.83*10^{-3}$ mole) bis-(methyl salicyl)carbonate (bMSC).

EXAMPLE 18

The procedure of EXAMPLE 1 was repeated but 8.3675 g ($24.6*10^{-3}$ mole) di-(ortho-sec-Butyl)bisphenol acetone (dosbBPA) and 8.1161 g ($24.6*10^{-3}$ mole) bis-(methyl salicyl)carbonate (bMSC) were added to the 25 g of polycarbonate A instead of 3.3470 g ($9.83*10^{-3}$ mole) di-(ortho-sec-butyl)bisphenol acetone (dosbBPA) and 3.2464 g ($9.83*10^{-3}$ mole) bis-(methyl salicyl)carbonate (bMSC).

EXAMPLE 19

The procedure of EXAMPLE 1 was repeated but i2.2638 g ($9.83*10^{-3}$ mole) dodecanoic diacid and 3.2464 g ($9.83*10^{-3}$ mole) bis-(methyl salicyl)carbonate (bMSC) were added to the 25 g of polycarbonate A instead of 3.3470 g ($9.83*10^{-3}$ mole) di-(ortho-sec-butyl)bisphenol acetone (dosbBPA) and 3.2464 g ($9.83*10^{-3}$ mole) bis-(methyl salicyl)carbonate (bMSC).

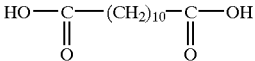

Dodecanoic diacid

EXAMPLE 20

The procedure of EXAMPLE 1 was repeated but 1.6232 g ($4.915*10^{-3}$ mole) bis-(methyl salicyl)carbonate (bMSC) was added with the dosbBPA to the 25 g of polycarbonate A instead of 3.2464 g ($9.83*10^{-3}$ mole) bis-(methyl salicyl) carbonate (bMSC).

EXAMPLE 21

The procedure of EXAMPLE 1 was repeated but 6.4928 g ($19.66*10^{-3}$ mole) bis-(methyl salicyl)carbonate (bMSC) was added with the dosbBPA to the 25 g of polycarbonate A instead of 3.2464 g ($9.83*10^{-3}$ mole) bis-(methyl salicyl) carbonate (bMSC).

EXAMPLE 22

The procedure of EXAMPLE 1 was repeated but 3.2464 g ($9.83*10^{-3}$ mole) bis-(methyl salicyl)carbonate (bMSC) 4.7426 g ($9.83*10^{-3}$ mole) bis-(benzyl salicyl)carbonate (bBSC) was added to the 25 g of polycarbonate A instead of 3.3470 g ($9.83*10^{-3}$ mole) di-(ortho-sec-butyl)bisphenol acetone (dosbBPA) and 3.2464 g ($9.83*10^{-3}$ mole) bis-(methyl salicyl)carbonate (bMSC).

EXAMPLE 23

The procedure of EXAMPLE 1 was repeated but instead of using polycarbonate A, polycarbonate F was used.

EXAMPLE 24

EXAMPLE 1 was repeated but instead of using 3.2464 g ($9.83*10^{-3}$ mole) bis-(methyl salicyl)carbonate (bMSC), 2.1050 g ($9.83*10^{-3}$ mole) diphenyl carbonate was added with the dosbBPA to the polymer.

EXAMPLE 25

The procedure of EXAMPLE 24 was repeated but instead of using polycarbonate A, polycarbonate B was used.

EXAMPLE 26

The procedure of EXAMPLE 24 was repeated but instead of using polycarbonate A, polycarbonate C was used.

COMPARATIVE EXAMPLE 1

The procedure of EXAMPLE 1 was repeated except without copolymerization reagent addition.

COMPARATIVE EXAMPLE 2

The procedure of EXAMPLE 1 was repeated but only 3.3470 g ($9.83*10^{-3}$ mole) di-(ortho-sec-butyl)bisphenol acetone (dosbBPA) was added without any bMSC to the polycarbonate A.

COMPARATIVE EXAMPLE 3

The procedure of EXAMPLE 4 was repeated but only 1.6330 g ($9.83*10^{-3}$ mole) terephthalic acid was added without any bMSC to the polycarbonate A.

COMPARATIVE EXAMPLE 4

The procedure of EXAMPLE 7 was repeated but only 1.0824 g ($9.83*10^{-3}$ mole) hydroquinone was added without any bMSC to the polycarbonate A.

COMPARATIVE EXAMPLE 5

The procedure of EXAMPLE 8 was repeated but only 1.8304 g ($9.83*10^{-3}$ mole) biphenol or [1,1'-Biphenyl]-4,4'-diol was added without any bMSC to the polycarbonate A.

COMPARATIVE EXAMPLE 6

The procedure of EXAMPLE 9 was repeated but only 2.4602 g ($9.83*10^{-3}$ mole) bisphenol sulfone or 4,4'-Sulfonyldiphenol was added without any bMSC to the polycarbonate A.

COMPARATIVE EXAMPLE 7

The procedure of EXAMPLE 1 was repeated but instead of using 3.3470 g ($9.83*10^{-3}$ mole) di-(ortho-sec-butyl) bisphenol acetone (dosbBPA) and 3.2464 g ($9.83*10^{-3}$ mole) bis methyl salicylate (bMSC) carbonate, 0.3779 g ($2.0*10^{-3}$ mole; 0.35 mole based on 1 mole of "Total terminal amount of chain ends") biphenol and 0.4978g ($1.5*10^{-3}$ mole; 0.26 mole based on 1 mole of "Total terminal amount of chain ends") bis-(methyl salicyl) carbonate (bMSC) was added to the polymer according to the preferred stoichiometries given by Kaneko et al., in lines 52–59 in column 6 and lines 22–26 in column 12 of U.S. Pat. No. 6,300,459. The "Total terminal chain ends" is the sum of all polycarbonate end groups of any kind and may be determined by NMR spectroscopy. For example, the "Total terminal amount of chain ends" is 1 mole when there is 0.5 mole of a polycarbonate having no branching (or a straight-chain polymer).

TABLE 3

Results of EXAMPLES and COMPARATIVE EXAMPLES.

| Example | PC-type | Name and structure | Mw (g/mole) | Mn (g/mole) | delta IV | mole % incorp. | Tg (° C.) |
|---|---|---|---|---|---|---|---|
| Example 1 | A | Di-(ortho-sec. Butyl) BPA<br>bis-(methyl salicyl) carbonate | 19695 | 8413 | −0.01 | 8.5 | 131 |
| Example 2 | A | Di-(ortho-sec. Butyl) BPA<br>bis-(methyl salicyl) carbonate | 19993 | 8443 | −0.01 | 4.6 | 140 |
| Example 3 | A | Di-(ortho-sec. Butyl) BPA<br>bis-(methyl salicyl) carbonate | 31746 | 14876 | 0.31 | 7.9 | 139 |
| Example 4 | A | Terephthalic Acid<br>bis-(methyl salicyl) carbonate | 20888 | 8700 | 0.00 | 3.3 | 151 |

TABLE 3-continued

Results of EXAMPLES and COMPARATIVE EXAMPLES.

| Example | PC-type | Name and structure | Mw (g/mole) | Mn (g/mole) | delta IV | mole % incorp. | Tg (° C.) |
|---|---|---|---|---|---|---|---|
| Example 5 | A | Resorcinol | 19421 | 7145 | −0.07 | 7.8 | 142 |
| Example 6 | A | bis-(methyl salicyl) carbonate Pre-Mixed Resorcinol/bis-(methyl salicyl) carbonate | 14323 | 5720 | −0.15 | 7.6 | 137 |
| Example 7 | A | Hydroquinone | 18359 | 7317 | −0.07 | 8.8 | 145 |
| Example 8 | A | bis-(methyl salicyl) carbonate BiPhenol | 25410 | 10632 | 0.10 | 9.8 | 154 |
| Example 9 | A | bis-(methyl salicyl) carbonate Bis-Phenol Sulfone | 11416 | 3571 | −0.25 | 6.9 | 147 |
| Example 10 | C | bis-(methyl salicyl) carbonate Di-(ortho-sec. Butyl) BPA | 30790 | 13393 | 0.16 | 8.6 | 137 |
| Example 11 | E | bis-(methyl salicyl) carboante Di-(ortho-sec. Butyl) BPA | 24767 | 10320 | −0.03 | 8.8 | 136 |
| Example 12 | B | bis-(methyl salicyl) carbonate Di-(ortho-sec. Butyl) BPA | 14697 | 6952 | 0.15 | 8.5 | 128 |
| Example 13 | D | bis-(methyl salicyl) carbonate Di-(ortho-sec. Butyl) BPA | 11735 | 5634 | 0.05 | 8.8 | 122 |
| Example 14 | A | bis-(methyl salicyl) carbonate Hydroquinone | 14591 | 6412 | −0.11 | 23.1 | 139 |
| Example 15 | A | bis-(methyl salicyl) carbonate Hydroquinone | 16957 | 7327 | −0.06 | 1) | 138 |
| Example 16 | A | bis-(methyl salicyl) carbonate Biphenol | 19336 | 9298 | 0.03 | 20.7 | 151 |
| Example 17 | A | bis-(methyl salicyl) carbonate Biphenol | 2) | | | | |
| Example 18 | A | bis-(methyl salicyl) carbonate Di-(ortho-sec. Butyl) BPA | 16188 | 7398 | −0.06 | 19.8 | 115 |
| Example 19 | A | bis-(methyl salicyl) carbonate Dodecanoic diacid | 19539 | 8577 | 0.00 | 8.4 | 123 |
| Example 20 | A | bis-(methyl salicyl) carbonate Di-(ortho-sec. Butyl) BPA | 10644 | 4987 | −0.18 | 9.9 | 126 |
| Example 21 | A | bis-(methyl salicyl) carbonate Di-(ortho-sec. Butyl) BPA | 10283 | 5658 | −0.15 | 8.7 | 118 |
| Example 22 | A | bis-(methyl salicyl) carbonate Di-(ortho-sec. Butyl) BPA bis-(benzyl salicyl) carbonate | 10923 | 5147 | −0.17 | 8.6 | 121 |

TABLE 3-continued

Results of EXAMPLES and COMPARATIVE EXAMPLES.

| Example | PC-type | Name and structure | Mw (g/mole) | Mn (g/mole) | delta IV | mole % incorp. | Tg (° C.) |
|---|---|---|---|---|---|---|---|
| Example 23 | F | Di-(ortho-sec. Butyl) BPA bis-(methyl salicyl) carbonate | 17876 | 8768 | 0.06 | 8.0 | 129 |
| Example 24 | A | Di-(ortho-sec. Butyl) BPA diphenyl carbonate 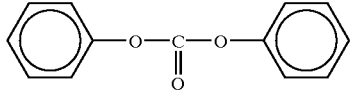 | 12989 | 6019 | −0.13 | 8.9 | 123 |
| Example 25 | B | Di-(ortho-sec. Butyl) BPA Di-phenyl carbonate | 14921 | 6983 | 0.15 | 8.9 | 129 |
| Example 26 | C | Di-(ortho-sec. Butyl) BPA Diphenyl carbonate | 13842 | 6680 | −0.17 | 2.5 | 128 |
| Comp. Example 1 | A | — | 21804 | 9673 | 0.05 | — | 147 |
| Comp. Example 2 | A | Di-(ortho-sec. Butyl) BPA | 9076 | 4447 | −0.21 | 9.3 | 115 |
| Comp. Example 3 | A | Terephthalic Acid | 14967 | 5987 | −0.13 | 0.8 | 144 |
| Comp. Example 4 | A | Hydroquinone | 8647 | 4152 | −0.22 | 6.3 | 132 |
| Comp. Example 5 | A | Biphenol | 15678 | 6161 | −0.12 | 0.3 | 146 |
| Comp. Example 6 | A | Bis-Phenol Sulfone | 8291 | 3390 | −0.26 | 6.9 | 124 |
| Comp. Example 7 | A | Biphenol bis-(methyl salicyl) carbonate | 20459 | 9184 | 0.03 | 2.0 | 147 |

1) Copolymer does not dissolve in MeCl$_3$D.
2) Copolymer does not dissolve in dichloromethane. MVR = 29.71 cm3/10 min. (300° C./21.6 kg/4 min.)

The EXAMPLEs and COMPARATIVE EXAMPLEs illustrate that adding a symmetrical optionally activated aromatic carbonic acid diester (B) together with an optionally substituted aromatic dihydroxy compound, diol or diacid monomer (C) gives better molecular weight buildup and incorporation of the monomer (B) than when the monomer is added alone. This improvement is shown in the comparisons between COMPARATIVE EXAMPLE 2 and EXAMPLE 1 for di-(ortho-sec-butyl) bisphenol acetone, COMPARATIVE EXAMPLE 3 and EXAMPLE 4 for terephthalic acid, COMPARATIVE EXAMPLE 5 and EXAMPLE 8 for biphenol or [1,1'-Biphenyl]-4,4'-diol, COMPARATIVE EXAMPLE 6 and EXAMPLE 9 for bisphenol sulfone or 4,4'-Sulfonyldiphenol. Also illustrated by comparing the results of EXAMPLEs 1, 20, and 21 is that the stoichiometry of added (B) to (C) is important in controlling the final molecular weight of the copolymer and the incorporation level of comonomer (C).

The EXAMPLEs and COMPARATIVE EXAMPLEs also illustrate that the use of activated carbonates like bis-(methyl salicyl)carbonate as the carbonic acid diester results in copolymers having higher molecular weights and incorporation levels of the added comonomer than non-activated carbonates like DPC. This improvement is shown in the comparisons between EXAMPLES 24, 25, and 26 and EXAMPLE 1.

The EXAMPLEs and COMPARATIVE EXAMPLEs also illustrate that molecular weights can be increased as in the method of Kaneko et al. (COMPARATIVE EXAMPLE 7) but with simultaneously incorporating much larger amounts of a comonomer (EXAMPLE 8 and 16) so that polymer properties like chemical resistance can be modified (EXAMPLE 15 and 17). Alternatively, the number average molecular weight or intrinsic viscosity can remain substantially unchanged, but a substantial amount of comonomer can be incorporated to modify a polymer property like the glass transition temperature, which can be either increased (comparison of starting polycarbonate A with Examples 4 or 16) or decreased it (comparison of starting polycarbonate A with Examples 1, 2 or 19 and comparison of starting polymer E with Example 11) depending upon the identity and amount of the comonomer that is incorporated.

The invention provides a method and system to provide polycarbonate product with customized properties for targeted applications. Kaneko et al. states (column 12, lines 16–21) that the intrinsic viscosity of the polymer product is increased by a value preferably 0.05 or more, more preferably 0.07 or more, and further preferably 0.1 or more compared with the intrinsic viscosity of the aromatic PC prior to the reaction. The polycarbonates of the EXAMPLEs show either a small decrease in intrinsic viscosity, no change in viscosity or an increase in viscosity. The viscosity of the product is a variable that is controllable according to the invention and is determined according to the application. For example, relatively low Mw (16 k to 20 k) polycarbonates can be used for optical media and disks because they flow better, whereas higher Mw (22 to 35 k) polycarbonates can be used for general purposes such as water bottles and sheets because greater impact strength is important in these applications.

In the invention, a target Mw can be controlled by selecting the oligomer (A) Mw and product polycarbonate properties can be controlled by selecting the copolymerization reagent. For example, flow-ductility balance, which is important for optical media, thin wall-sheet and profiles, can be provided by a particular copolymerization reagent. Or improved replication or reduced optical birefringence, which are important for optical media, can be provided by selected the copolymerization reagent. Or the copolymerization reagent can be selected to reduce water swell or uptake or to increase flame retardence or chemical resistance.

While preferred embodiments of the invention have been described, the present invention is capable of variation and modification and therefore should not be limited to the precise details of the EXAMPLES. The invention includes changes and alterations that fall within the purview of the following claims.

What is claimed is:

1. A method for preparing a polycarbonate, comprising: preparing a (A) free hydroxyl-containing polycarbonate and reacting the (A) free hydroxyl-containing polycarbonate with a controlled stoichiometric mixture of a (B) symmetrical optionally activated aromatic carbonic acid diester and an (C) optionally substituted aromatic dihydroxy compound, diol or diacid.

2. The method of claim 1, further comprising combining the (B) symmetrical optionally activated aromatic carbonic acid diester and the (C) optionally substituted aromatic dihydroxy compound, diol or diacid in a stoichiometric molar ratio of about 0.25 to about 3.0 (B) to (C) to form the controlled mixture.

3. The method of claim 1, further comprising combining the (B) symmetrical optionally activated aromatic carbonic acid diester and the (C) optionally substituted aromatic dihydroxy compound, diol or diacid in a stoichiometric molar ratio of between 0.75 to 1.25 (B) to (C) to form the controlled mixture.

4. The method of claim 1, further comprising combining the (B) symmetrical optionally activated aromatic carbonic acid diester and the (C) optionally substituted aromatic dihydroxy compound, diol or diacid in a stoichiometric molar ratio of between 1.0 to 1.08 (B) to (C) to form the controlled mixture.

5. The method of claim 1, comprising preparing the (A) free hydroxyl-containing polycarbonate by reacting a (i) aromatic dihydroxy compound with a (ii) carbonic acid diester.

6. The method of claim 1, comprising preparing the (A) free hydroxyl-containing polycarbonate by reacting a (i) aromatic dihydroxy compound with a (ii) carbonic acid diester and reacting the (A) free hydroxyl-containing polycarbonate with the mixture in a stoichiometric molar ratio of about 0.01 to about 0.75 (C) optionally substituted aromatic dihydroxy compound, diol or diacid to the (i) aromatic dihydroxy compound reacted to form the (A) free hydroxyl-containing polycarbonate.

7. The method of claim 1, comprising preparing the (A) free hydroxyl-containing polycarbonate by reacting a (i) aromatic dihydroxy compound with a (ii) carbonic acid disester and reacting the (A) free hydroxyl-containing polycarbonate with the mixture in a stoichiometric molar ratio of about 0.1 to about 0.5 (C) optionally substituted aromatic dihydroxy compound, diol or diacid to the (i) aromatic dihydroxy compound reacted to form the (A) free hydroxyl-containing polycarbonate.

8. The method of claim 1, comprising preparing the (A) free hydroxyl-containing polycarbonate by reacting a (i) aromatic dihydroxy compound with a (ii) carbonic acid diester and reacting the (A) free hydroxyl-containing polycarbonate with the mixture in a stoichiometric molar ratio of about 0.2 to about 0.4 (C) optionally substituted aromatic dihydroxy compound, diol or diacid to the (i) aromatic dihydroxy compound reacted to form the (A) free hydroxyl-containing polycarbonate.

9. The method of claim 1, wherein the symmetrical optionally activated aromatic carbonic acid diester (B) comprises:

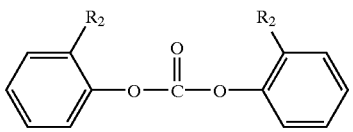

wherein $R_2$ is an electronegative substituent.

10. The method of claim 9, wherein the electronegative substituent $R_2$ is selected from a nitro group, halo group and carbonyl-containing group.

11. The method of claim 9, wherein the electronegative substituent $R_2$ is selected from methoxycarbonyl, ethoxycarbonyl, propoxycarbonyl, phenylcarbonyl, phenoxycarbonyl and benzyloxycarbonyl.

12. The method of claim 9, wherein the electronegative substituent $R_2$ is methoxycarbonyl.

13. The method of claim 1, wherein the optionally substituted aromatic dihydroxy compound, diol or diacid (C) is a compound of the general formula:

$$A_xG_y$$

wherein A is a $C_{1-20}$ polymethylene, $C_{2-20}$ alkylene, $C_{2-20}$ alkylidene, $C_{5-36}$ cycloalkylene, $C_{6-36}$ cycloalkylidene, $C_{6-36}$ arylene, $C_{6-36}$ alkylarylene or $C_{6-36}$ arylalkylene and x is 0 or an integer, wherein G is a monovalent $C_6$–$C_{30}$ hydrocarbon having at least one hydroxyl or carboxylic acid group bonded directly to an alkyl group, aromatic ring or cycloaliphatic ring and y is an integer equal to 1 or greater than 1 and wherein each G may be the same or different.

14. The method of claim 1, wherein the optionally substituted aromatic dihydroxy compound, diol or diacid (C) is a compound selected from di-ortho-sec-butyl-bisphenol A, terephthalic acid, 2-methyl-2,4-pentandiol, resorcinol, hydroquinone, [1,1'-biphenyl]-4,4'-diol and bisphenol sulfone.

15. The method of claim 1, wherein the optionally substituted aromatic dihydroxy compound, diol or diacid (C) is in a concentration of about 0.1 to 50 mole percent with respect to the bisphenol content of the polycarbonate.

16. The method of claim 1, wherein the optionally substituted aromatic dihydroxy compound, diol or diacid (C) is in a concentration of about 0.1 to 20 mole percent with respect to the bisphenol content of the polycarbonate.

17. The method of claim 1, wherein the symmetrical optionally activated aromatic carbonic acid diester (B) comprises a compound of the formula:

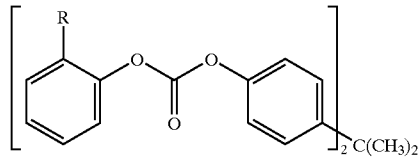

wherein R is an electronegative substituent.

18. The method of claim 17, wherein the electronegative substituent R is selected from a nitro group, halo group or carbonyl-containing group.

19. The method of claim 1, wherein the mixture comprises at least some and up to 25 mol % of an asymmetrical activated carbonate of the formula:

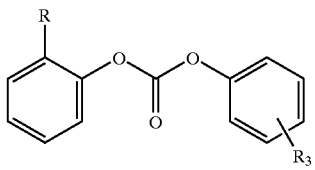

wherein R is an electronegative substituent and $R_3$ is selected from among hydrogen, $C_1$ to $C_{36}$ alkyl, $C_1$ to $C_{36}$ alkoxy, $C_6$ to $C_{36}$ aryl, $C_7$ to $C_{36}$ aralkyl, and $C_7$ to $C_{36}$ aralkoxy.

20. The method of claim 1, wherein the mixture comprises the symmetrical optionally activated aromatic carbonic acid diester (B) and the optionally substituted aromatic hihydroxy compound, diol or diacid (C) in a mole ratio of from 10:90 to 90:10.

21. The method of claim 1, wherein the mixture is added in an amount to provide a 0.5 to 3 mole ratio of mixture carbonate to free-hydroxyl and acid end groups of the mixture and polycarbonate.

22. The method of claim 1, wherein the hydroxyl-containing polycarbonate is reacted with the mixture in a continuous or semi-continuous reactor system.

23. The method of claim 1, wherein the hydroxyl-containing polycarbonate is reacted with the mixture in a reactor system comprising two or more reactors in series.

24. The method of claim 1, wherein the hydroxyl-containing polycarbonate is reacted with the mixture in a static mixer.

25. The method of claim 1, comprising preparing the hydroxyl-containing polycarbonate in a continuously stirred tank reactor of a melt reaction system.

26. The method of claim 1, comprising preparing the hydroxyl-containing polycarbonate in a continuously stirred tank reactor of a melt reaction system and subsequently reacting the prepared hydroxyl-containing polycarbonate with the mixture of (B) and (C).

27. The method of claim 1, comprising preparing the hydroxyl-containing polycarbonate in a continuously stirred tank reactor of a melt reaction system and subsequently reacting the prepared hydroxyl-containing polycarbonate with the mixture of (B) and (C) in a finishing section of the melt reaction system.

28. The method of claim 1, comprising preparing the hydroxyl-containing polycarbonate in a continuously stirred tank reactor of a melt reaction system and subsequently reacting the prepared hydroxyl-containing polycarbonate with the mixture of (B) and (C) in an extruder.

29. The method of claim 1, comprising preparing the hydroxyl-containing polycarbonate in a continuously stirred tank reactor of a melt reaction system, charging the prepared hydroxyl-containing polycarbonate to split production lines and reacting the prepared hydroxyl-containing polycarbonate with the mixture of (B) and (C) in an extruder in at least one of the split production lines.

30. The method of claim 1, comprising reacting an hydroxyl-containing polycarbonate having a molecular weight of at least 4000 Dalton with the mixture of (B) and (C).

31. The method of claim 1, comprising reacting an hydroxyl-containing polycarbonate having a molecular weight of at least 24000 Dalton with the mixture of (B) and (C).

32. The method of claim 1, comprising preparing the hydroxyl-containing polycarbonate in a continuously stirred tank reactor of a melt reaction system and commencing reacting of the mixture of (B) and (C) with forming hydroxyl-containing polycarbonate in a finishing section of the melt reaction system prior to complete forming of the hydroxyl-containing polycarbonate.

33. The method of claim 1, wherein (A), (B) and (C) are selected to produce a copolycarbonate with a phenolic content having 500 ppm or less electron-withdrawing ortho-substituents.

34. The method of claim 1, wherein (A), (B) and (C) are selected to produce a copolycarbonate with a phenolic content having 100 ppm or less electron-withdrawing ortho-substituents.

35. The method of claim 1, wherein proportions of (A), (B) and (C) are controlled to produce a copolycarbonate having 500 ppm or less residual unreacted (B) and (C).

36. The method of claim 1, wherein proportions of (A), (B) and (C) are controlled to produce a copolycarbonate having 100 ppm or less residual unreacted (B) and (C).

37. The method of claim 1, wherein proportions of (A), (B) and (C) are controlled to produce a copolycarbonate having 5,000 ppm or less terminal 2-(alkoxycarbonyl)phenyl, 2-(phenoxycarbonyl)phenyl, 2-(benzyloxycarbonyl) phenyl or 2-benzoylphenyl content.

38. The method of claim 1, wherein the formed copolycarbonate has 5000 ppm or less terminal 2-(methoxycarbonyl)phenyl group content.

39. The method of claim 1, wherein the formed copolycarbonate has a glass transition temperature of about 120 to 150° C.

40. The method of claim 1, wherein said method is a melt transesterification reaction.

41. The method of claim 1, wherein the symmetrical optionally activated aromatic carbonic acid diester (B) comprises:

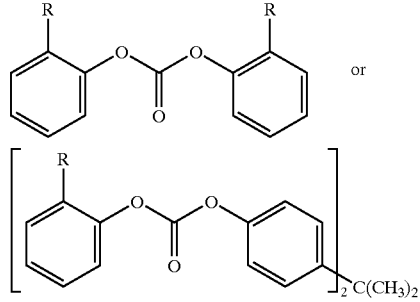

wherein R is an electronegative substituent.

42. The method of claim 1, wherein the (A) free hydroxyl-containing polycarbonate has a molecular weight of about 4,000 to about 40,000.

43. The method of claim 1, wherein the (A) free hydroxyl-containing polycarbonate has a molecular weight of about 6,000 to about 30,000.

44. The method of claim 1, wherein the (A) free hydroxyl-containing polycarbonate has a molecular weight of about 7,500 to about 25,000.

45. The method of claim 1, wherein the (A) free hydroxyl-containing polycarbonate is prepared in the presence of a catalyst and the (A) free hydroxyl-containing polycarbonate is reacted with the controlled stoichiometric mixture of a (B) symmetrical optionally activated aromatic carbonic acid diester and an (C) optionally substituted aromatic dihydroxy compound, diol or diacid in the absence of additional catalyst to obtain a high molecular weight copolycarbonate.

46. The method of claim 1, further comprising selecting the mixture of (B) and (C) for reaction with (A) to determine properties of product copolycarbonate.

47. The method of claim 1, further comprising selecting the mixture of (B) and (C) for reaction with (A) to determine a flow-ductility balance, replication, optical birefringence, water swell or flame retardence property of product copolycarbonate.

48. The method of claim 1, wherein the (A) free hydroxyl-containing polycarbonate is prepared and is reacted with the mixture in a continuous process.

49. The method of claim 1, wherein the (A) free hydroxyl-containing polycarbonate is prepared and is reacted with the mixture in a continuous process in contiguous reactors.

50. The method of claim 1, comprising reacting (A) with a mixture of (B) and (C) that is selected to produce a copolycarbonate having suitable optical storage media properties.

51. A copolymerization reagent comprising a mixture of (B) a symmetrical optionally activated aromatic carbonic acid diester and (C) an optionally substituted aromatic hihydroxy compound, diol or diacid.

52. The copolymerization reagent of claim 51, wherein the symmetrical optionally activated aromatic carbonic acid diester (B) comprises:

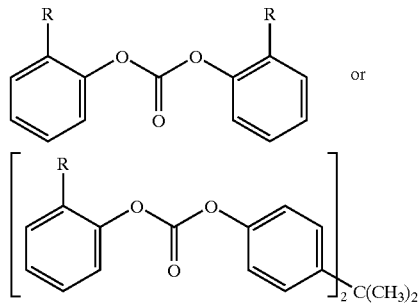

wherein R is an electronegative substituent.

53. The copolymerization reagent of claim 52, wherein the electronegative substituent R is methoxycarbonyl.

54. The copolymerization reagent of claim 51, wherein R is selected from nitro groups, halo groups, and carbonyl-containing groups.

55. The copolymerization reagent of claim 51, wherein the electronegative substituents R is selected from methoxycarbonyl, ethoxycarbonyl, propoxycarbonyl, phenylcarbonyl, phenoxycarbonyl and benzyloxycarbonyl.

56. The copolymerization reagent of claim 51, wherein the optionally substituted aromatic dihydroxy compound, diol or diacid (C) is a compound of the general formula:

$A_xG_y$ wherein A is a $C_{1-20}$ polymethylene, $C_{2-20}$ alkylene, $C_{2-20}$ alkylidene, $C_{5-36}$ cycloalkylene, $C_{5-36}$ cycloalkylidene, $C_{6-36}$ arylene, $C_{6-36}$ alkylarylene or $C_{6-36}$ arylalkylene and x is 0 or an integer, wherein G is a monovalent $C_6$–$C_{30}$ hydrocarbon having at least one hydroxyl or carboxylic acid group bonded directly to an alkyl group, aromatic ring or cycloaliphatic ring and y is an integer equal to 1 or greater than 1 and wherein each G may be the same or different.

57. The copolymerization reagent of claim 51, wherein the optionally substituted bisphenol, diol or diacid (C) is a compound selected from di-ortho-sec-butyl-bisphenol A, terephthalic acid, 2-methyl-2,4-pentandiol, resorcinol, hydroquinone, [1,1'-biphenyl]-4,4'-diol and bisphenol sulfone.

58. The copolymerization reagent of claim 51, comprising (B) and (C) in a mole ratio of from about 0.25 to about 3.0 (B) to (C).

59. The copolymerization reagent of claim 51, comprising (B) and (C) in a mole ratio of from 0.75 to 1.25 (B) to (C).

60. The copolymerization reagent of claim 51, comprising (B) and (C) in a mole ratio of from 1.0 to 1.08 (B) to (C).

61. A method for preparing a copolycarbonate, comprising: reacting an (i) aromatic dihydroxy compound with a (ii) carbonic acid diester to prepare a (A) free hydroxyl-containing polycarbonate and reacting the (A) free hydroxyl-containing polycarbonate with a mixture of a (B) symmetrical optionally activated aromatic carbonic acid diester and an (C) optionally substituted aromatic dihydroxy compound, diol or diacid in a stoichiometric molar ratio of about 0.01 to about 0.75 (C) optionally substituted aromatic dihydroxy compound, diol or diacid to (i) aromatic dihydroxy compound reacted to form the (A) free hydroxyl-containing polycarbonate.

62. The method of claim 61, comprising reacting the (A) free hydroxyl-containing polycarbonate with the mixture of a (B) symmetrical optionally activated aromatic carbonic acid diester and the (C) optionally substituted aromatic dihydroxy compound, diol or diacid in a stoichiometric molar ratio of about 0.1 to about 0.5 (C) optionally substituted aromatic dihydroxy compound, diol or diacid to (i) aromatic dihydroxy compound reacted to form the (A) free hydroxyl-containing polycarbonate.

63. The method of claim 61, comprising reacting the (A) free hydroxyl-containing polycarbonate with the mixture of a (B) symmetrical optionally activated aromatic carbonic acid diester and the (C) optionally substituted aromatic dihydroxy compound, diol or diacid in a stoichiometric molar ratio of about 0.2 to about 0.4 (C) optionally substituted aromatic dihydroxy compound, diol or diacid to (i) aromatic dihydroxy compound reacted to form the (A) free hydroxyl-containing polycarbonate.

64. The method of claim 61, further comprising forming the mixture of the (B) symmetrical optionally activated aromatic carbonic acid diester and the (C) optionally substituted aromatic dihydroxy compound, diol or diacid in a stoichiometric molar ratio of about 0.25 to about 3.0 (B) to (C).

65. The method of claim 61, further comprising forming the mixture of the (B) symmetrical optionally activated aromatic carbonic acid diester and the (C) optionally substituted aromatic dihydroxy compound, diol or diacid in a stoichiometric molar ratio of between 0.75 to 1.25 (B) to (C).

66. The method of claim 61, further comprising forming the mixture of the (B) symmetrical optionally activated aromatic carbonic acid diester and the (C) optionally substituted aromatic dihydroxy compound, diol or diacid in a stoichiometric molar ratio of between 1.0 to 1.08 (B) to (C).

67. The method of claim 61, wherein the (A) free hydroxyl-containing polycarbonate is prepared and is reacted with the mixture in a continuous process.

68. The method of claim 61, wherein the (A) free hydroxyl-containing polycarbonate is prepared and is reacted with the mixture in a continuous process in contiguous reactors.

69. The method of claim 61, comprising reacting (i) with (ii), in a mole ratio of about 0.8 mole to about 1.30 moles of carbonic diester (ii) to 1 mole of the aromatic dihydroxy compound (i).

70. The method of claim 61, comprising reacting (i) with (ii), in a mole ratio of about 1.01 moles to about 1.20 moles of carbonic diester (ii) to 1 mole of the aromatic dihydroxy compound (i).

71. A method for preparing a copolycarbonate, comprising: reacting an (i) aromatic dihydroxy compound with a (ii)

carbonic acid diester to prepare a (A) free hydroxyl-containing polycarbonate and reacting the (A) free hydroxyl-containing polycarbonate with a mixture of a (B) symmetrical optionally activated aromatic carbonic acid diester and an (C) optionally substituted aromatic dihydroxy compound, diol or diacid, wherein the activity of (A) the polycarbonate in reaction with the mixture of (B) and (C) is controlled by varying the free-hydroxyl content of (A).

72. The method of claim 71, wherein the free-hydroxyl content of (A) is varied by melt equilibrating a polycarbonate having a lower level of free hydroxyl content with a polycarbonate having a higher level of free hydroxyl content.

73. The method of claim 71, wherein the free-hydroxyl content of (A) is varied by controlling a molar ratio of (i) the aromatic dihydroxy compound to (ii) the carbonic acid diester.

74. The method of claim 71, comprising reacting (i) with (ii), in a mole ratio of about 0.8 mole to about 1.30 moles of carbonic diester (ii) to 1 mole of the aromatic dihydroxy compound (i).

75. The method of claim 71, comprising reacting (i) with (ii), in a mole ratio of about 1.01 moles to about 1.20 moles of carbonic diester (ii) to 1 mole of the aromatic dihydroxy compound (i).

76. The method of claim 71, comprising reacting bisphenol A with diphenyl carbonate to prepare (A) and varying the free-hydroxyl content of (A) by controlling a molar ratio of bisphenol A to diphenyl carbonate.

77. A copolymer comprising:
(A) [polycarbonate moieties]$_x$ comprising (i) aromatic dihydroxy moieties and (ii) carbonic acid diester moieties;
(B) [symmetrical optionally activated aromatic carbonic acid diester moieties]$_y$; and
(C) [optionally substituted aromatic hihydroxy compound, diol or diacid moieties]$_z$, wherein x is 20 to 92 mole percent, y is 4 to 40 mole percent and z is 4 to 40 mole percent of the copolymer.

78. The copolymer of claim 77, wherein x=40 to 70, y=15 to 30 and z=15 to 30 mole percent of the copolymer.

79. The copolymer of claim 77, wherein x=46 to 60, y=20 to 27 and z=20 to 27 mole percent of the copolymer.

80. The copolymer of claim 77, wherein the (B) [symmetrical optionally activated aromatic carbonic acid diester] moiety comprises:

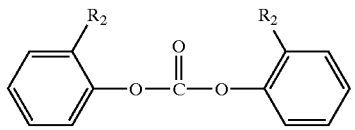

wherein $R_2$ is an electronegative substituent.

81. The copolymer of claim 80, wherein the electronegative substituent $R_2$ is selected from a nitro group, halo group and carbonyl-containing group.

82. The copolymer of claim 80, wherein the electronegative substituent $R_2$ is selected from methoxycarbonyl, ethoxycarbonyl, propoxycarbonyl, phenylcarbonyl, phenoxycarbonyl and benzyloxycarbonyl.

83. The copolymer of claim 80, wherein the electronegative substituent $R_2$ is methoxycarbonyl.

84. The copolymer of claim 77, wherein the optionally substituted aromatic dihydroxy compound, diol or diacid (C) is a compound of the general formula:

$A_xG_y$ wherein A is a $C_{1-20}$ polymethylene, $C_{2-20}$ alkylene, $C_{2-20}$ alkylidene, $C_{5-36}$ cycloalkylene, $C_{5-36}$ cycloalkylidene, $C_{6-36}$ arylene, $C_{6-36}$ alkylarylene or $C_{6-36}$ arylalkylene and x is 0 or an integer, wherein G is a monovalent $C_6$–$C_{30}$ hydrocarbon having at least one hydroxyl or carboxylic acid group bonded directly to an alkyl group, aromatic ring or cycloaliphatic ring and y is an integer equal to 1 or greater than 1 and wherein each G may be the same or different.

85. The copolymer of claim 77, wherein the optionally substituted aromatic dihydroxy compound, diol or diacid (C) is derived from di-ortho-sec-butyl-bisphenol A, terephthalic acid, 2-methyl-2,4-pentandiol, resorcinol, hydroquinone, [1,1'-biphenyl]-4,4'-diol and bisphenol sulfone.

86. The copolymer of claim 77, wherein the symmetrical optionally activated aromatic carbonic acid diester moiety is derived from the formula:

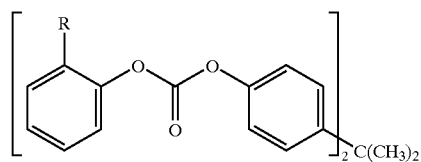

wherein R is an electronegative substituent.

87. The copolymer of claim 86, wherein the electronegative substituent R is selected from a nitro group, halo group or carbonyl-containing group.

88. The copolymer of claim 77, comprising an asymmetrical activated carbonate moiety of the formula:

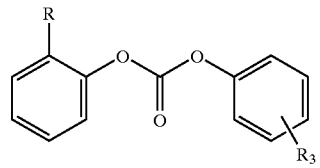

wherein R is an electronegative substituent and $R_3$ is selected from among hydrogen, $C_1$ to $C_{36}$ alkyl, $C_1$ to $C_{36}$ alkoxy, $C_6$ to $C_{36}$ aryl, $C_7$ to $C_{36}$ aralkyl, and $C_7$ to $C_{36}$ aralkoxy.

89. The copolymer of claim 77, wherein the copolycarbonate has a phenolic content having 500 ppm or less electron-withdrawing ortho-substituents.

90. The copolymer of claim 77, wherein the copolycarbonate has a phenolic content having 100 ppm or less electron-withdrawing ortho-substituents.

91. The copolymer of claim 77, wherein the copolycarbonate has 500 ppm or less residual unreacted (B) and (C).

92. The copolymer of claim 77, wherein the copolycarbonate has 100 ppm or less residual unreacted (B) and (C).

93. The copolymer of claim 77, wherein the copolycarbonate has 5,000 ppm or less terminal 2-(alkoxycarbonyl) phenyl, 2-(phenoxycarbonyl)phenyl, 2-(benzyloxycarbonyl) phenyl or 2-benzoylphenyl content.

94. The copolymer of claim 77, wherein the copolycarbonate has 5000 ppm or less terminal 2-(methoxycarbonyl) phenyl group content.

95. The copolymer of claim 77, wherein the copolycarbonate has a glass transition temperature of about 120 to 150° C.

96. A method for preparing a copolycarbonate, comprising: preparing a (A) free hydroxyl-containing polycarbonate and sequentially reacting the (A) free hydroxyl-containing polycarbonate in at least a first copolymerization and a second copolymerization with mixtures of a (B) symmetrical optionally activated aromatic carbonic acid diester and an (C) optionally substituted aromatic dihydroxy compound, diol or diacid.

97. The method of claim 96, further comprising selecting ratios of (C) optionally substituted bisphenol, diol or diacid and (A) free hydroxyl-containing polycarbonate for reaction in respective first and second copolymerizations to (a) control copolycarbonate product molecular weight, (b) facilitate reaction of relatively unreactive (A) polycarbonate, (c) facilitate removal of by product, (d) facilitate reaction of relatively unreative (B) or (C) or (e) combinations of (a), (b), (c) or (d).

98. The method of claim 96, further comprising selecting the mixtures of (B) and (C) to determine properties of product copolycarbonate.

99. The method of claim 96, further comprising combining the (B) symmetrical optionally activated aromatic carbonic acid diester and the (C) optionally substituted aromatic dihydroxy compound, diol or diacid in a stoichiometric molar ratio of about 0.25 to about 3.0 (B) to (C) to form the mixtures.

100. The method of claim 96, further comprising combining the (B) symmetrical optionally activated aromatic carbonic acid diester and the (C) optionally substituted aromatic dihydroxy compound, diol or diacid in a stoichiometric molar ratio of between 0.75 to 1.25 (B) to (C) to form the mixtures.

101. The method of claim 96, further comprising combining the (B) symmetrical optionally activated aromatic carbonic acid diester and the (C) optionally substituted aromatic dihydroxy compound, diol or diacid in a stoichiometric molar ratio of between 1.0 to 1.08 (B) to (C) to form the mixtures.

102. A system for preparing a copolycarbonate, comprising:
    a first reactor for reacting an (i) aromatic dihydroxy compound with a (ii) carbonic acid diester to produce a polycarbonate; and
    a contiguous polymerizer for reacting a controlled stoichiometric mixture of a (B) symmetrical optionally activated aromatic carbonic acid diester and an (C) optionally substituted aromatic dihydroxy compound, diol or diacid with the polycarbonate to produce a copolycarbonate.

103. The system of claim 102, comprising a plurality of additive lines to the polymerizer for adding the controlled mixture at a plurality of locations along a line of the reactor and contiguous polymerizer.

104. The system of claim 102, comprising a line to add a controlled mixture before a polymerizer, into the polymerizer or subsequent to the polymerizer.

105. The system of claim 102, additionally comprising an extruder subsequent to the polymerizer to compound additives into the copolycarbonate.

106. The system of claim 102, additionally comprising an extruder subsequent to the polymerizer to compound additives into the copolycarbonate and a line to add a controlled mixture before the extruder or into the extruder.

107. The system of claim 102, comprising a plurality of polymerizers.

108. The system of claim 102, comprising a plurality of sequentially arranged polymerizers and a line to add a controlled mixture before or into a last polymerizer in the sequence.

109. The system of claim 102, wherein the controlled stoichiometric mixture comprises (B) and (C) in a stoichiometric molar ratio of about 0.25 to about 3.0 (B) to (C).

110. The system of claim 102, wherein the controlled stoichiometric mixture comprises (B) and (C) in a stoichiometric molar ratio of between 0.75 to 1.25 (B) to (C).

111. The system of claim 102, wherein the controlled stoichiometric mixture comprises (B) and (C) in a stoichiometric molar between 1.0 to 1.08 (B) to (C).

112. A method for preparing an optical storage media, comprising:
    preparing a (A) free hydroxyl-containing polycarbonate;
    reacting the (A) free hydroxyl-containing polycarbonate with a controlled stoichiometric mixture of a (B) symmetrical optionally activated aromatic carbonic acid diester and an (C) optionally substituted aromatic dihydroxy compound, diol or diacid to produce a copolymer; and
    incorporating the copolymer into an optical structure as a storage media.

* * * * *